May 11, 1943.  F. M. REID  2,318,802
TRAILER VEHICLE
Filed Dec. 5, 1941  3 Sheets-Sheet 3
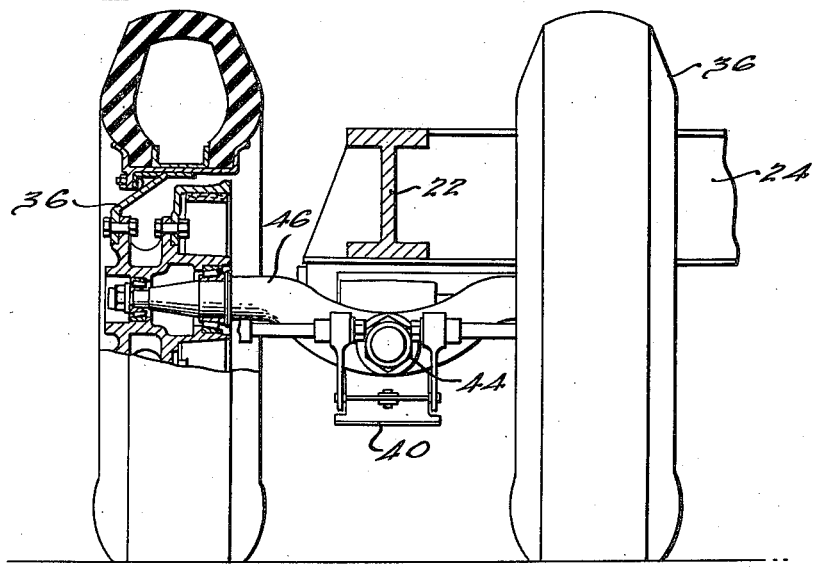
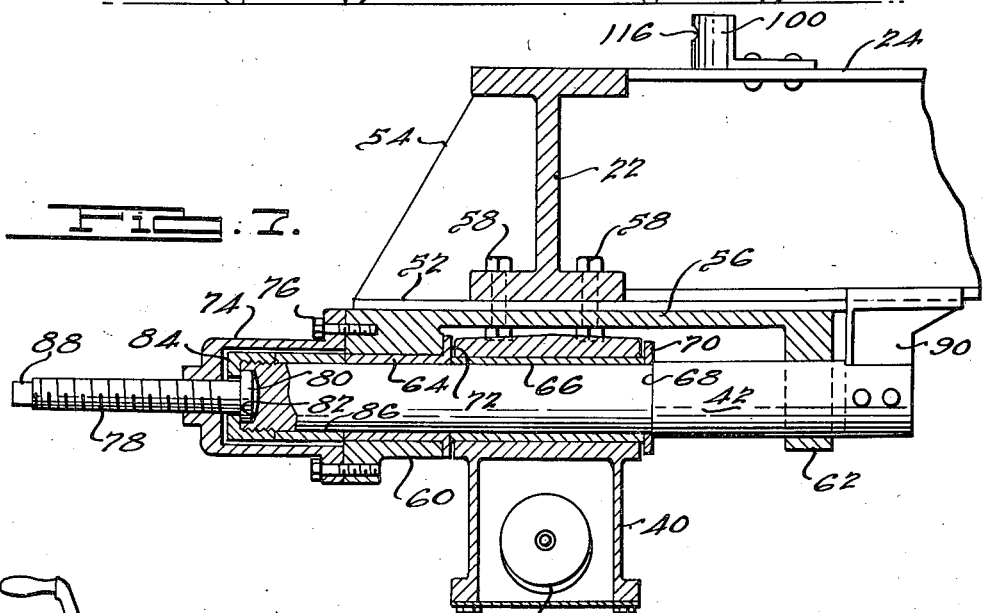
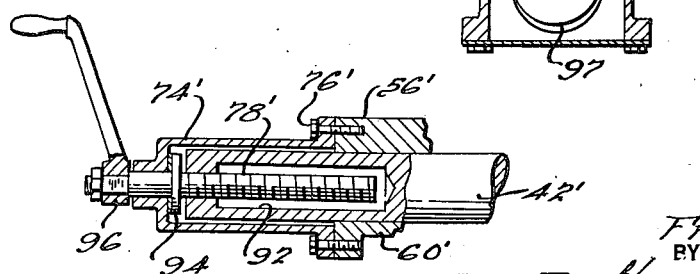
INVENTOR
Frederick M. Reid
BY
Harness, Dickey & Pierce.
ATTORNEYS.

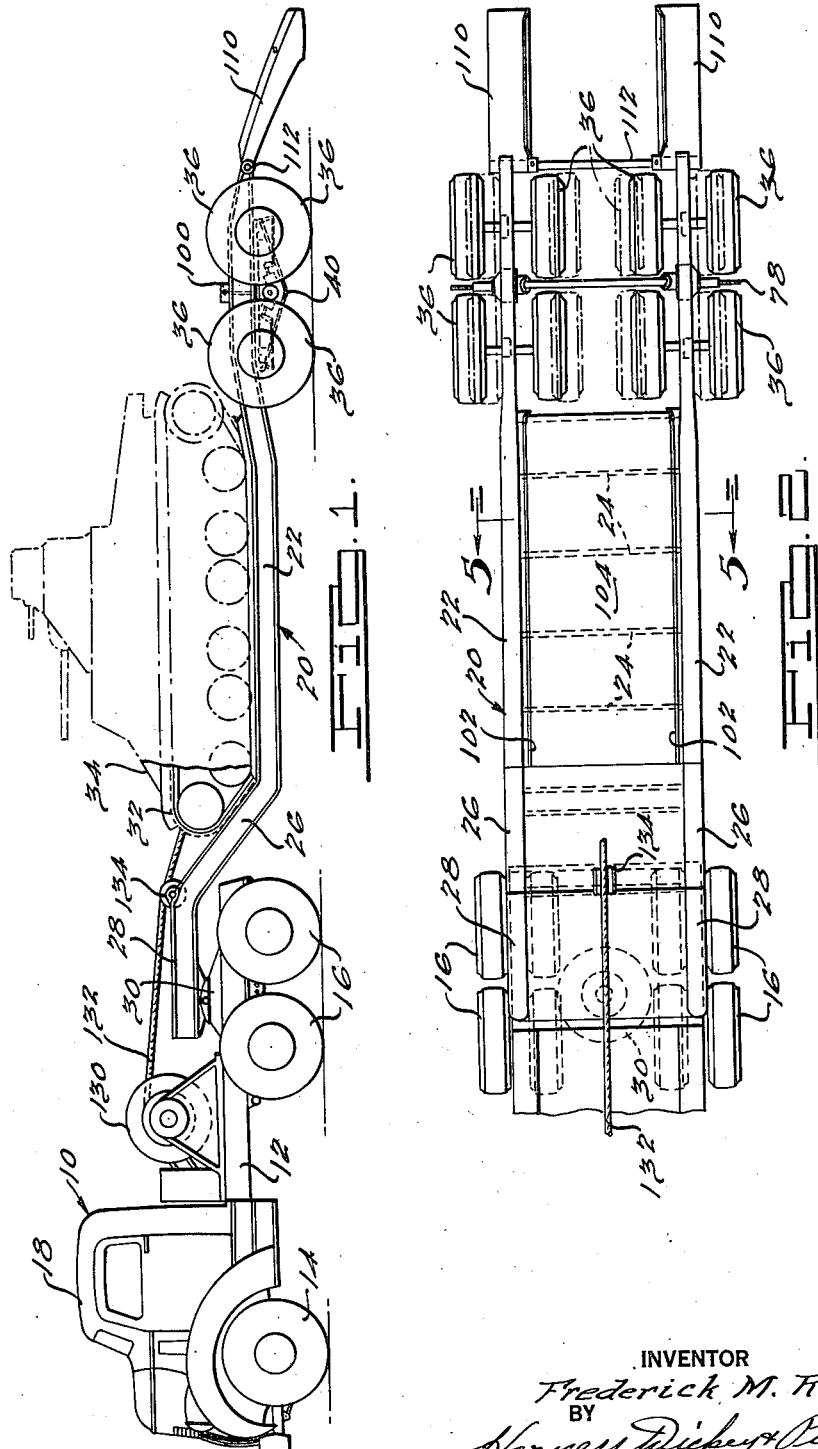

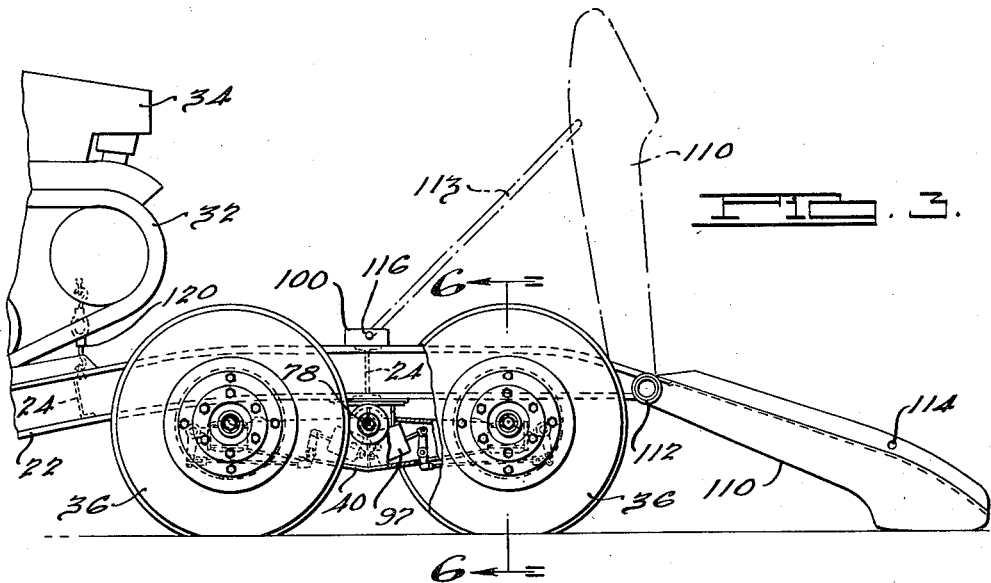
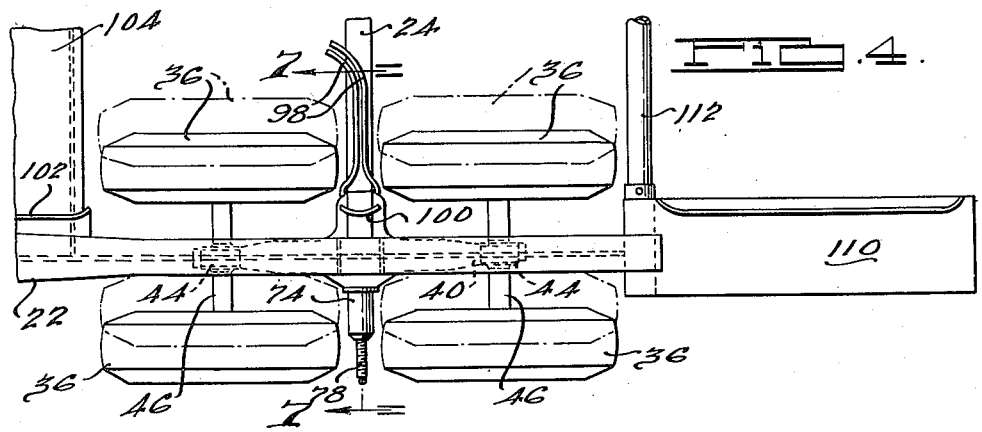
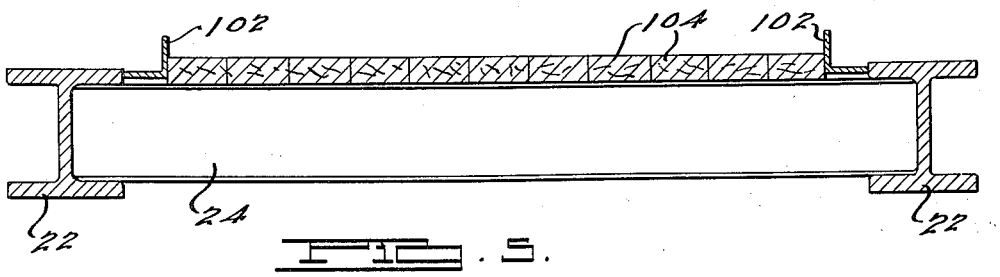

Patented May 11, 1943

2,318,802

UNITED STATES PATENT OFFICE 2,318,802

TRAILER VEHICLE

Frederick M. Reid, Detroit, Mich., assignor to Fruehauf Trailer Company, Detroit, Mich., a corporation of Michigan Application December 5, 1941, Serial No. 421,710

15 Claims. (Cl. 280—81)

This invention relates to trailer vehicles of the low bed heavy duty type and has for its principal object the provision of a trailer of the type described, enabling the load supporting platform thereof to be positioned below the top of the wheels without necessitating the load being completely elevated above the wheels in being applied to or removed from the vehicle and yet presenting a construction of minimum width for certain purposes.

Objects of the invention include the provision of a trailer vehicle having spaced apart wheels on each side thereof and at least at one end thereof, together with means for shifting said wheels bodily laterally of the vehicle for loading or unloading or for other purposes; the provision of a vehicle of the type described at least one end of which is supported by a pair of transversely aligned trucks, each truck comprising a walking beam connected to a pair of transversely spaced wheels at each end thereof, together with means for shifting said walking beam with said wheels attached thereto laterally of the vehicle; the provision of a trailer vehicle having a pair of transversely spaced wheels under each side thereof and at least one end thereof together with a load supporting track extending between the upper portions of said wheels and below the top surface of the wheels, each pair of wheels being bodily shiftable in a direction transverse to the length of the vehicle whereby to so position them with respect to said track as to permit a load to be moved over the track to a loaded position on the vehicle or to an unloaded position therefrom, the wheels thereafter being shiftable bodily to reduce the lateral dimensions of the vehicle to a desired dimension; and the provision of a vehicle as above described in which loading and unloading skids are permanently associated with an end of each of the load supporting tracks.

The above being among the objects of the present invention, the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Figure 1 is a side elevational view of a tractor-trailer combination and in which the trailer is constructed in accordance with the present invention;

Fig. 2 is a plan view of the trailer shown in Fig. 1 and illustrating a portion of the tractor cooperating therewith;

Fig. 3 is an enlarged, fragmentary, side elevational view of that portion of the tractor illustrated in Figs. 1 and 2 including the rear supporting wheels thereof;

Fig. 4 is a fragmentary plan view of that portion of the trailer vehicle illustrated in Fig. 3, the fragment shown comprising one side of the trailer only;

Fig. 5 is an enlarged, transverse, sectional view taken on the line 5—5 of Fig. 2;

Fig. 6 is an enlarged, fragmentary, transverse vertical sectional view taken on the line 6—6 of Fig. 3;

Fig. 7 is an enlarged, fragmentary, transverse sectional view taken in a vertical plane passing centrally through the walking beam shifting mechanism as on the line 7—7 of Fig. 4; and, Fig. 8 is a fragmentary vertical sectional view illustrating a modified form of shifting mechanism for the walking beam.

While the present invention has been particularly designed for the transportation of army tanks, it will be appreciated by those skilled in the art that it is applicable for use in the transportation of any wheeled or endless track vehicle or any other load having laterally spaced supporting structures providing ground or other clearance therebetween. For the purpose of brevity in description the explanation of the present invention will be limited to its use in the transportation of army tanks, its use for other purposes thereby being made apparent to those skilled in the art.

Disabled army tanks require some means enabling them to be picked up and transported in an expeditious manner to some point of repair. Furthermore, such tanks usually being of relatively slow speed, it is desirous of providing some means by which they may be transported to a point of approximate use in a quick and simple manner. Trailer vehicles provide an answer to this problem inasmuch as they may be readily hauled at relatively high speed to substantially any desired location. However, in connection with such trailer vehicles it is desirable to support the tanks in as closely adjacent relationship with respect to the ground as is practical in view of the ground clearance required and it is desirable that the tanks be lifted a minimum amount in placing them upon such trailer vehicles. The use of small diameter wheels would be helpful in this respect but it has been found that such wheels when heavily loaded in mud or other soft surface have a tendency to slide bodily rather than to roll, thus rendering them impractical for use and necessitating the use of wheels of large diameter. The lifting of the tanks a minimum amount in loading or unloading in spite of the use of large wheels is accomplished in accordance with the present invention by utilizing the frame side members of the trailer vehicle as a track for engagement and support of the usual endless track of a tank and by so positioning such side frame track members of the trailer vehicle vertically with respect to the wheels of the vehicle at one end thereof that the wheels between the frame side members project upwardly into the usual ground clearance area between the endless track chains of the tank as the tank passes over such wheels of the vehicle in being loaded on or unloaded from such vehicle.

Such tanks are, of course, usually of a relatively heavy nature requiring the trailer vehicle which is to transport the same to be provided with a multiplicity of wheels particularly under the rear end thereof and a desirable arrangement of such wheels is their employment in laterally spaced pairs under each side of the vehicle, the wheels of each pair being disposed on opposite sides of the corresponding side frame members. It is desirable, however, that such trailer vehicles with or without a tank mounted thereon be capable of being transported by railroad and because of the width of such tanks it has been found that where the pairs of wheels supporting one end of the trailer vehicle are so spaced from one another and positioned as to permit a tank to pass between them on the side frame members above described, the overall width of the trailer vehicle through such supporting wheels exceeds the maximum width permitted on railways for necessary clearance purposes.

This last-mentioned difficulty is overcome in accordance with a further phase of the present invention by mounting such pairs of wheels for bodily shiftable movement transversely of the vehicle, whereby when it is desired to load a tank on or unload a tank from such trailer vehicle such pairs of wheels of the trailer vehicle may be moved to a laterally outward position in which the tank may pass over the side member track elements of the trailer vehicle with the required amount of clearance between the endless track elements thereof and the wheels, and after the tank is loaded on or unloaded from the trailer vehicle, the wheels may be shifted laterally inwardly whereby to reduce the overall width of the trailer vehicle through the wheels to such an extent as to bring such lateral dimensions within the permissible width required for railway rolling stock.

The problem of laterally shifting the wheels as above desired is simplified if such wheels are arranged in the manner broadly disclosed in my United States Letters Patent No. 1,690,247, issued November 6, 1926, on Heavy duty vehicle. In that patent, a pair of walking beams are mounted under the rear end of the vehicle for independent pivotal movement about a horizontal line extending transversely of the vehicle, and each end of each walking beam is provided with a cross-member pivoted thereto midway between its ends for pivotal movement in a vertical plane extending transversely of the vehicle. A wheel is rotatably mounted upon each end of each of said cross-members so that there are four wheels associated with each walking beam and consequently, eight wheels are provided for supporting such end of the vehicle. In accordance with this phase of the present invention, these walking beams are mounted for bodily shiftable movement transversely of the vehicle, the wheels, of course, moving bodily therewith. While such bodily movement of the walking beams and wheels may be accomplished in a number of different ways as will be obvious to those skilled in the art, perhaps the simplest way is to simply elongate the pivot pin for each walking beam and simply slide the walking beam axially on the pivot pin to obtain the desired movement.

The trailer vehicle of the present invention may be of the full trailer type having supporting wheels at both the front and the rear end thereof, or it may be of the semi-trailer type having supporting wheels at the rear end only thereof and the front end of which is adapted to be supported upon the rear end of the tractor vehicle. This latter type of construction is that preferred and, accordingly, is that employed to illustrate the present invention in the accompanying drawings.

Referring now to the accompanying drawings, and particularly Fig. 1, a conventional type of tractor vehicle is illustrated generally at 10 and as including the usual frame 12 which is supported at its front end by steerable front wheels 14, and at its rear end by tandem wheels 16. The wheels 16, and preferably the wheels 14 also, are driven by means of an engine located forwardly and below the usual cab 18 in a conventional manner. The wheels 16 in particular may be either single wheels or dual wheels.

The trailer which is illustrated generally at 20 includes a pair of laterally spaced, longitudinally extending parallel frame side members 22 each one of which, as best illustrated in Fig. 5, is preferably formed from a relatively heavy I-beam suitably bent to the shape shown. The frame side members 22 are rigidly connected together at intervals over their lengths by a plurality of transversely extending, longitudinally spaced cross members 24, some of which may be of channel-section and some of which may be of I-beam section, as indicated in Fig. 3. The longitudinally central portions of the frame side members 22 are horizontally disposed and flat and arranged in as closely adjacent relationship with respect to the ground as clearance requirements for the vehicle permits. Each flat central portion is integrally joined at its forward end to an upwardly disposed portion 26 which extends to a point above the frame 12 of the tractor 10 and is there joined to a horizontally forwardly extending portion 28 which extends over the rear end of the frame 12 of the tractor 10 and is there secured to the frame 12 of the tractor by means of a fifth-wheel structure indicated generally at 30. This fifth-wheel structure may be of any conventional construction such as shown in my United States Letters Patent No. 1,925,279, issued September 5, 1933, but in this particular case may be of a permanently coupled type inasmuch as it may be desirable, particularly where the assembly is employed for hauling tanks, to maintain the tractor and the trailer as a unitary assembly at all times. In any event, the fifth-wheel structure 30 includes a vertically disposed pivot pin interconnecting the tractor and trailer so as to enable turning movement of the tractor relative to the trailer for steering purposes.

The rear end portions of the frame side members 22 are shown elevated with respect to the flat central portion thereof for the purpose of providing the necessary clearance for the rear wheel supporting mechanism which will now be described, this being necessary only in such cases where the flat central portion of the trailer is located at a position above the ground less than that possible for the frame side members over the length of the wheel supporting mechanism.

It should be noted that the frame side members 22 are spaced from one another transversely of the vehicle by a distance equal to the transverse spacing of the endless tracks 32 of the tank 34 shown supported thereon in Fig. 1, so that when the tank is being transported by the trailer 20 each endless track 32 is centrally disposed with respect to its corresponding frame side member 22 and when being loaded onto or removed from the trailer 20 to or from the flat central portion of the frame side members 22, where it is positioned for transportation, the rear portions of the side frame members 22 serve as tracks along which the tank may be moved to loaded or unloaded position.

As previously mentioned, because of the great weight of the load required to be transported by the trailer vehicle, it is necessary to support the rear end thereof by a multiplicity of wheels such as 36. Preferably there is a wheel disposed inwardly and outwardly of each frame side member 22 at the rear end of the vehicle and such wheels are required to be of a relatively large diameter in order to insure proper rolling action thereof when relatively deeply mired. In accordance with one phase of the present invention, in order that the tank 34 when being loaded on or unloaded from the trailer 20 will be required to be elevated a minimum amount in passing over the rear wheel area, the frame side members 22 are arranged between pairs of the rear wheels and with their upper surfaces below the upper surfaces of the wheels. The amount which the wheels thus project above that portion of the frame side member passing between them is slightly less than the usual ground clearance provided for the tank 34 between the endless tracks 32 thereof, so that when the tank 34 is being loaded onto or unloaded from the trailer 20, those wheels 36 between the frame side members 22 will be located within that portion of the tank 34 in which the usual ground clearance is provided and, therefore, will offer no obstruction to the passage of the tank 34 thereover. By this arrangement, a minimum amount of elevation of the tank 34 is required in passing over the rear end of the trailer to or from the flat central portion thereof where it is normally located for transportation purposes.

As previously mentioned, where the pairs of wheels 36 supporting the rear end of the trailer are positioned in equally spaced relation on either side of the side frame members 22 as required to permit the passage of the tank 34 over the frame side members 22 within the area of the rear wheels, then the maximum transverse dimension of the trailer as measured axially of the wheels is greater than the maximum width permitted on American railroads. Such maximum width on American railways is ten feet, whereas with the arrangement of the wheels shown in full line in Fig. 2, and where the trailer 20 is constructed for a so-called medium or approximately thirty ton tank, the width of the trailer through the rear wheels is approximately eleven feet, six inches, in other words, one foot and six inches more than is permitted. This disadvantage is overcome in accordance with another phase of the present invention.

In accordance with this later phase of the present invention, the pairs of rear wheels 36 are mounted for bodily shiftable movement transversely of the vehicle, whereby when the tank 34 is to be loaded on or loaded from the trailer 20, the rear wheels may be moved to the position illustrated in full lines in Fig. 2, and where the tractor-trailer combination is to be loaded on a freight car, the rear wheels 36 of the trailer 20 may be bodily shifted inwardly to the position indicated in dotted lines in Fig. 2 in which position their maximum transverse dimension does not exceed ten feet, thus permitting the shipment of the trailer on standard railroad rolling stock and within a permissible maximum width of load therefor. While, as before mentioned, in the broader aspects of the present invention, any suitable means may be provided for mounting such rear wheels for bodily shiftable movement transversely of the trailer 20, and regardless of whether such rear wheels are arranged in tandem or not, it is preferable to arrange such wheels in tandem and in the general manner disclosed and claimed in my United States Patent No. 1,690,247. With such an arrangement, a truck is arranged under each side of the trailer 20 at the rear end thereof. Each truck comprises a walking beam 40 extending in parallelism with its corresponding frame side member 22 and directly thereunder when the wheels are in their laterally outwardly shifted position indicated in full lines in the drawings. Each walking beam 40 is mounted midway between its ends for pivotal movement in a vertical plane about the axis of a transversely extending horizontal pivot pin or shaft 42, suitably carried by the trailer frame in the manner which will hereinafter be described. The forward and rearward end of each walking beam 40 is formed to provide a cylindrical journal 44, best shown in Figs. 4 and 6, arranged with its axis extending longitudinally of the corresponding walking beam 40. Upon each journal 44, a cross member or axle 46 is pivotally mounted midway between its ends. Each cross axle 46 is, therefore, mounted for pivotal movement about a generally horizontal axis extending longitudinally of the trailer 20 for movement in an approximately vertical plane. Upon the outer end of each cross axle 46, a wheel 36 is mounted for rotation about a generally horizontal axis extending transversely of the trailer 20. One wheel 36 on each cross axle is, therefore, positioned laterally outwardly of the corresponding frame side member 22 and the other laterally inwardly of such member 22. The wheels 36 may be of any suitable or conventional construction and equipped with either solid or pneumatic tires, the latter being shown by way of illustration. Likewise, the wheels 36 may be either of the dual or the single type, the latter being shown in the drawings by way of illustration. Thus, each truck comprises four wheels arranged in two pairs, one in advance of the other, and because of the pivotal mounting of the walking beam, each pair may move vertically with respect to the other pair on the same truck and each wheel of each pair may move vertically with respect to the other thereof. Thus, the wheels of each truck are so mounted that all of the wheels may move relative to one another to equalize the load between them as the trailer passes over an unequal supporting surface and inasmuch as the movement of the wheels of one truck is entirely independent of the movement of the wheels of the other truck, all of the rear supporting wheels 36 may move relative to and independently of each other so as to equalize the load between all of them as the trailer moves over an unequal supporting road or other surface.

The exact construction of the walking beam 40, transverse axles 46, and the arrangement for the brake applying mechanism for the wheels 36 may be that shown in my previous United States Patent above identified or of any other satisfactory construction. The construction which is the preferred construction is that shown and described in my copending application for Letters Patent of the United States for improvements in Vehicle undercarriage and brake operating mechanisms, filed July 31, 1941, and serially numbered 404,750, Patent No. 2,311,252, Feb. 16, 1943.

Referring now particularly to Fig. 7 which illustrates the means for supporting each rear truck for bodily shiftable movement transversely of the vehicle, it will be noted that the pivot pin 42 is mounted directly below a cross member 24 of I-beam construction. The lower face of such I-beam is flush with the lower face of the frame side member 22 at this location and a plate 52 is suitably secured to the under face of each frame side member 22 and the corresponding end of the frame cross member 24 at such point. A gusset member 54 is preferably extended between the outer end of such plate 22 and the upper flange of the corresponding side rail as indicated in Fig. 7. To the lower face of each plate member 52, a bracket member indicated generally at 56 is suitably fixed as by means of bolts 58 which extend up through the lower flange of the corresponding frame side rail 22. Each bracket 56 is provided at its opposite ends with a pair of transversely spaced, downwardly projecting bosses or flanges 60 and 62, respectively, which are provided with transversely aligned apertures for reception of the corresponding shaft or pivot pin 42. The aperture in the outer of such bosses 60 is preferably provided with a bushing 64 axially slidable therein, while the aperture in the inner of the bosses 62 may directly slidably receive the pin or shaft 42 therein as indicated.

Each walking beam 40 itself is apertured for reception of the corresponding pin or shaft 42, which aperture is provided with a bushing 66 in which the shaft 42 is rotatably received. The inner end of each pin or shaft 42 is slightly enlarged so as to form a shoulder 68 adjacent the inner side of the corresponding walking beam 40 and against which a thrust ring 70 is positioned for engagement with the inner face of the corresponding walking beam 40 around its bushing 66. The inner end of each bushing 64 is provided with an annular, radially outwardly directed flange 72 which is adapted to abut the outer face of the corresponding walking beam 40 around its bushing 66. Each walking beam 40 is, therefore, mounted for pivotal movement about the axis of the corresponding pin or shaft 42 and such pin or shaft 42 is mounted for axial sliding movement in the bosses 60 and 62. The bosses 60 and 62 being laterally spaced from each other by a distance greater than the width of the walking beam 40 between them, the walking beam 40 is, therefore, shiftable with its shaft or pin 42 between the brackets 60 and 62 of the corresponding bracket 56, thus permitting each walking beam 40, its corresponding axle cross shafts 46 and wheels 36 to be bodily shifted transversely of the vehicle within the limits provided by the spacing of the corresponding bosses 60 and 62. This permissible amount of shifting of each supporting truck is, as previously explained, sufficient to insure that when the supporting trucks are shifted to the innermost position of their laterally shiftable movement, the maximum transverse dimension across the wheels 36 will not exceed the maximum permissible transverse dimension for railroad rolling stock.

In the broader aspects of the invention, each rear supporting truck may be shifted on its corresponding pin or shaft 42 manually or by means of any suitable mechanical or fluid pressure operated device. Screw means are illustrated for effecting such movement as such means have been found satisfactory particularly inasmuch as they are relatively inexpensive to provide and are efficient and effective in use.

Accordingly, as illustrated in Fig. 7, to the outer face of each boss 60, a hollow cylindrical housing 74 is secured in concentric relation with respect to the corresponding pin or shaft 42 by means of screws 76, and the outer end of the corresponding pin or shaft 42 is extended so as to be receivable therein when in the outer of its shiftable positions. The outer end of each housing 74 is provided with a wall provided with a central threaded aperture in which a threaded shaft 78 is threadably received. The inner end of each shaft 78 is provided with an enlarged head 80 received in a pocket 82 provided therefor concentrically in the outer end of the corresponding pin or shaft 42. A flanged nut 84 is rotatably received about each screw shaft 78 in contact with the under side of the head 80 thereof and is threaded upon the outer end of the pin or shaft 42, thereby to secure the head 80 against relative axial movement with respect to the corresponding pin or shaft 42 but permitting relative rotation thereof with respect to such pin or shaft. Each nut 84 projects radially outwardly beyond the surface of the corresponding pin or shaft 42 and between its inner end and the outer end of the bushing 64, a bushing or sleeve 86 is received upon the pin or shaft 42. The outer end of each screw shaft 78 is preferably squared as at 88 for removable reception of a crank, wrench, or the like to enable the screw shaft 78 to be manually or otherwise rotated. Relative rotation of each pin or shaft 42 is prevented by means of a bracket 90 secured to the inner end thereof inwardly of the corresponding boss 62 and the upper margin of which slidably embraces the opposite side marginal edges of the lower flange of the cross member 24 thereabove.

With the above described construction, it will be appreciated that when the screw shaft 78 is rotated to cause the screw shaft 78 to move inwardly with respect to its housing 74, the head 80 of the screw shaft 78 will bear against the pin or shaft 42 to cause it to move inwardly therewith. The pin or shaft 42 in thus moving inwardly will act through the nut 84 and bushings 86 and 64 to move the walking beam 40 and all parts secured thereto inwardly with the pin or shaft 42 until the thrust ring 70 strikes the outer face of the inner boss 62, which will thus limit such inward movement of each supporting truck. Such position is that illustrated in dotted lines in Figs. 2 and 4.

When it is desired to move the trucks outwardly from such inward limit of their movable positions, as above described, then rotation of the screw shaft 78 on each truck to move such screw shaft laterally outwardly of the vehicle will act through engagement of its head 80 with the nut 84 of the corresponding pin or shaft 42 to draw such pin or shaft 42 outwardly, and will act through the thrust ring 70 to move the corresponding walking beam 40 outwardly therewith and through the latter to move the bushings 64 and 86 back to the position illustrated in full lines in Fig. 7. With this construction, the screw shaft 78, of course, moves outwardly and inwardly with each truck during the outward and inward movement thereof with respect to the trailer. In view of the fact that the outer end of each screw shaft 78 is located within the lateral outward surface of the corresponding wheels 36, as best brought out in Fig. 4, they will never offer any obstruction outwardly beyond the wheels.

In Fig. 8, a slightly modified form of mechanism for shifting the pivot pins for the walking beams 40 is illustrated. Parts equivalent to those illustrated in Fig. 7 are illustrated by the same numerals except that such numerals bear a prime mark, thus simplifying the description of the same. In this case, the pins or shafts 42' are hollowed out at their outer ends as at 92 and the outer end of such hollowed out portion is restricted and threaded for threadable reception of the screw shaft 78'. The screw shaft 78' in this case is rotatably mounted in the outer end of the housing 74' and is provided with a radial flange 94 inwardly thereof and a handle 96 secured thereto outwardly thereof for holding the shaft 78' against axial movement with respect to the housing 74'. Accordingly, with this construction, turning of the handle 96 causes equal turning of the screw shaft 78 and causes the pin or shaft 42' to be threaded outwardly or inwardly relative to the threaded shaft 78', depending upon the direction of rotation thereof, the corresponding walking beam 40 being caused to move inwardly or outwardly with the pin or shaft 42' in the same general manner as illustrated in Fig. 7, or by any equivalent means.

While the brakes for the wheels 36 may be of any conventional construction and may be actuated in any suitable or conventional manner, they are preferably actuated by fluid pressure and preferably by means of compressed air cylinders, one for the brakes on each pair of wheels at each end of the walking beams 40, such as are illustrated at 97 in Fig. 3, and located within the hollow interior of the walking beam. The cylinders 97 are suitably connected to the corresponding wheels in a manner fully disclosed in my copending application for Letters Patent of the United States above identified. The cylinders 97 are connected to a suitable source of air under pressure by means of flexible tubes 98, shown in Fig. 4, these tubes yielding when the supporting trucks are shifted inwardly or outwardly, as previously described, without affecting such shifting movement or proper operation of the brakes.

In order to aid in guiding the tank 34 centrally of the side frame members 22 in its movement thereover, the cross member 24 above the pivot pins 42 is provided on its upper surface and inwardly of each frame side member 22 with an upwardly extending abutment element 100 suitably fixed thereto. As best indicated in Fig. 4, the abutment elements 100 are curved in plan view so as to enable them to engage the endless tracks 32 of the tank 34 without danger of snagging the same. These abutments 100 serve to center the tank 34 in its passage thereover. Additionally, and as best brought out in Figs. 2 and 5, forwardly of the wheels 36 and over the central flat portion of the side frame elements 22, an angle member 102 is suitably fixed to the underlying cross members 24 inwardly of each frame side member 22 and in parallel relation thereto with one flange thereof projecting vertically upwardly above the upper face of the corresponding frame side member 22, thus to provide guides for engagement with the inner faces of the endless tracks 32 of the tank 34 to centralize it during its passage thereover and to maintain it against lateral shifting movement when once loaded on the trailer. If desired, wooden flooring elements such as 104 may be extended over the upper faces of the cross members 24 between the angle members 102 and over the length thereof for the purpose of receiving any accessory equipment or the like that may be necessary or desirable in the use of the trailer or in the operation of loading or unloading a tank with respect thereto.

In order to facilitate the loading of a tank 34 upon the trailer 20, or removal of such tank therefrom, a pair of skids 110 are provided at the rear end of the trailer. For this purpose, a tube 112 is extended between the rear ends of the frame side members 22 and suitably secured thereto, and one end of each skid 110 is pivotally secured thereto in longitudinal alignment with the corresponding frame side member 22, thus permanently connecting the skids in place. When the skids 110 are to be employed during the loading or unloading of a tank such as 34 upon the trailer 20, the skids 110 are pivoted to bring their outer free ends in contact with the ground as indicated in full lines in Fig. 3, and when not employed are pivoted to an upper position illustrated in dotted lines in Fig. 3. They may conveniently be maintained in such elevated position by means of tie rods, such as 113. Each tie rod may comprise a straight bar having inturned end portions, one end of which may be received and secured within a corresponding hole, such as 114, in the corresponding skid 110 and the opposite end of which may be received within a corresponding hole, such as 116, in the corresponding abutment 100 previously described.

It will be appreciated from the above description that in accordance with the present invention, when it is desired to load a tank such as 34 on the trailer 20, the wheels 36 are moved to their laterally outward limit of their movable positions if not already in such position. This is accomplished by jacking up the rear end of the trailer 20 so as to relieve the load on the wheels 36 and then turning the screw shafts 78 in a direction to accomplish such positioning of the wheels, after which the rear end of the trailer is lowered and the jacks removed. The skids 110 are then lowered to the position indicated in full lines in Fig. 3 and a tank, such as 34, is then run or pulled up the skids 110 onto the frame side members 22 and then moved longitudinally thereof over the wheels 36 to the central flat portion of the trailer, the abutments 100 and guides 102 serving to maintain the alignment of the endless chains 32 of the tank with respect to the frame side members 22 during such movement. It will also be appreciated that during such movement the wheels 36 positioned between the frame side members 22 will be received between the lower runs of the opposite endless chains 32 of the tank, with their upper portions received in that portion under the tank designed for normal ground clearance. After the tank has been moved to the desired position, it may be suitably secured in place against relative longitudinal movement thereon by means of turn buckles such as 120 illustrated in Fig. 3 extending between a portion of the tank frame and, for instance, the guides 102 of the trailer 20. The skids 110 are thereupon raised and secured in place by the bars 112. The trailer 20 may then be moved over a road or other supporting surface with the wheels 36 positioned in their laterally outward limit of position as indicated in full lines in the drawings, or such wheels may be moved to the inner limit of their transverse position for such transporting movement, if desired, this, of course, being accomplished by again jacking up the rear end of the trailer and operating the screws 78 to effect such movement. In any case, where the trailers are to be mounted on railroad flat cars, for instance, for transportation with or without a tank, such as 34, mounted thereon, before the trailer 20 is mounted upon such flat car, the wheels 36 will be moved to the inner limit of their movable position in the manner above described prior to their being placed on the flat cars. As previously mentioned, the tractor 10 will ordinarily be connected to the trailer 20 during all such operations and where the rear wheels of the tractor 10 project outwardly to such an extent that their overall dimensions exceed the permissible transverse dimensions on railways, after the unit has been mounted on the flat car, the outer wheels 16 of the tractor 10 may be removed, thereby reducing the maximum transverse dimensions of the tractor, so as to bring it within the permissible maximum dimensions allowed.

Inasmuch as one of the principal uses of the arrangement above described is for the transportation of disabled tanks which therefore will usually be unable to move under their own power, it is preferable to provide some means for dragging a tank bodily upon the trailer 20 under such conditions. Such means may conveniently comprise a hoisting or winding drum, such as 130, suitably mounted upon the tractor 10 and suitably driven from the power plant thereof. A cable such as 132, secured to the drum, may thus be employed for securement to a tank and which upon operation of the drum 130 will enable the tank 34 to be pulled upon the trailer. Under such circumstances, it is preferable to mount a roller, such as 134, midway between the opposite frame side members 22 of the trailer at the points where the portions 26 and 28 of the frame side members join, so as to guard against unnecessary abrasion of the cable 134.

Having thus described my invention, what I claim by Letters Patent is:

1. In a vehicle, in combination, a pair of frame side members, wheels supporting one end of said frame, said wheels being arranged in pairs spaced from each other transversely of said frame, one wheel of each of said pairs of wheels being located between said frame side members and the remaining wheels of said pairs of wheels being located laterally outwardly of said frame side members, and a slidable connection between each of said pairs of wheels and its corresponding frame side member permitting bodily shiftable movement of each of said pairs of wheels as a unit transversely of the length of said frame.

2. In a vehicle, in combination, a frame, pairs of wheels at each side of said frame for supporting an end thereof, said wheels being arranged in tandem, and a slidable connection between each of said pairs of wheels and said frame permitting bodily shiftable movement of said pairs of wheels transversely of the length of said frame.

3. In a vehicle, in combination, a frame, wheels arranged in tandem pairs under each side of said frame adjacent one end thereof for supporting one end of said frame, slidable connecting means between said wheels on each side of said vehicle and said frame permitting bodily shiftable movement of said wheels on each side of said frame as a unit transversely of the length of said frame, and means cooperating between said wheels on each side of said frame and said frame for causing said shiftable movement of said wheels with respect to said frame.

4. In a vehicle, in combination, a frame including a pair of frame side members, two pairs of interconnected tandem wheels, one of said pairs of wheels being positioned with its axes of rotation below one of said frame side members at one end thereof and the other of said pairs of wheels being positioned with its axes of rotation below the remaining of said frame side members at the corresponding end of said frame, a slidable connection between each of said pairs of wheels and its corresponding frame side member for securing said wheels to said frame side members for bodily shiftable movement transversely of the length of said frame, and means cooperating between each of said pairs of wheels and said frame for effecting said bodily shiftable movement of said pairs of wheels.

5. In a vehicle, in combination, a frame, a walking beam positioned below one end of said frame adjacent each side thereof, means connecting each said walking beam to said frame for pivotal movement about a horizontal axis extending transversely of the length of said frame and for bodily slidable movement in the direction of said axis, and wheels rotatably supported at the opposite ends of said walking beams.

6. In a vehicle, in combination, a frame, a pair of walking beams positioned below one end of said frame one adjacent each side thereof, means connecting each of said walking beams to said frame for pivotal movement about a horizontal axis extending transversely of the length of said frame and for bodily slidable movement in the direction of said axis, wheels rotatably supported at opposite ends of said walking beam, and means cooperating between said walking beams and said frame for effecting sliding movement of said walking beams relative to said frame in the direction of the pivotal axes thereof.

7. In a vehicle, in combination, a frame, a walking beam positioned below one end of said frame adjacent each side thereof, means connecting each said walking beam to said frame for pivotal movement about a horizontal axis extending transversely of the length of said frame and for bodily slidable movement in the direction of said axis, a transverse axle mounted on each end of each of said walking beams for pivotal movement about a line extending longitudinally of the corresponding said walking beam, and a ground engaging wheel rotatably mounted on the outer ends of each of said transverse axles.

8. In a vehicle, in combination, a pair of laterally spaced side members, a walking beam positioned below each of said frame side members at one end thereof, said walking beams extending longitudinally of said frame side members, means forming a pivotal connection between each of said walking beams and said frame for movement of said walking beams about a horizontal line extending transversely of the length of said frame, said pivotal connections mounting said walking beams for bodily shiftable movement in the direction of the pivotal axes thereof, a transversely directed axle rotatably mounted between its ends on each end of each of said walking beams for movement about an axis extending longitudinally of the corresponding said walking beam, a wheel rotatably mounted upon the laterally inner end of each of said axles and located laterally inwardly of the corresponding of said frame side members, and a wheel rotatably mounted upon the laterally outer end of each of said cross axles and located laterally outwardly of the corresponding of said frame side members.

9. In a vehicle, in combination, a pair of laterally spaced side members, a walking beam positioned below each of said frame side members at one end thereof, said walking beams extending longitudinally of said frame side members, means forming a pivotal connection between each of said walking beams and said frame for movement of said walking beams about a horizontal line extending transversely of the length of said frame, said pivotal connections mounting said walking beams for bodily shiftable movement in the direction of the pivotal axes thereof, a transversely directed axle rotatably mounted between its ends on each end of each of said walking beams for movement about an axis extending longitudinally of the corresponding said walking beam, a wheel rotatably mounted upon the laterally inner end of each of said axles and located laterally inwardly of the corresponding of said frame side members, a wheel rotatably mounted upon the laterally outer end of each of said cross axles and located laterally outwardly of the corresponding of said frame side members, said wheels supported by each of said cross axles being spaced from each other transversely of said frame by a distance greater than the width of the corresponding frame side member, and means limiting said bodily slidable movement of said walking beams whereby to prevent contact between said wheels and their corresponding said frame side member.

10. In a vehicle, in combination, a pair of laterally spaced side members, a walking beam positioned below each of said frame side members at one end thereof, said walking beams extending longitudinally of said frame side members, means forming a pivotal connection between each of said walking beams and said frame for movement of said walking beams about a horizontal line extending transversely of the length of said frame, said pivotal connections mounting said walking beams for bodily shiftable movement in the direction of the pivotal axes thereof, a transversely directed axle rotatably mounted between its ends on each end of each of said walking beams for movement about an axis extending longitudinally of the corresponding said walking beam, a wheel rotatably mounted upon the laterally inner end of each of said axles and located laterally inwardly of the corresponding of said frame side members, a wheel rotatably mounted upon the laterally outer end of each of said cross axles and located laterally outwardly of the corresponding of said frame side members, said wheels supported by each of said cross axles being spaced from each other transversely of said frame by a distance greater than the width of the corresponding frame side member, means limiting said bodily slidable movement of said walking beams whereby to prevent contact between said wheels and their corresponding said frame side member, and means cooperating between said frame and each of said walking beams for controlling the slidable position of said walking beams.

11. In a vehicle, in combination, a pair of laterally spaced frame side members, a walking beam positioned below each of said frame side members at one end thereof, said walking beams extending longitudinally of said frame side members, means forming a pivotal connection between each of said walking beams and said frame for movement of said walking beams about a horizontal line extending transversely of the length of said frame, said pivotal connections mounting said walking beams for bodily shiftable movement in the direction of the pivotal axes thereof, a transversely directed axle rotatably mounted between its ends on each end of each of said walking beams for movement about an axis extending longitudinally of the corresponding said walking beam, a wheel rotatably mounted upon the laterally inner end of each of said axles and located laterally inwardly of the corresponding of said frame side members, a wheel rotatably mounted upon the laterally outer end of each of said cross axles and located laterally outwardly of the corresponding of said frame side members, and means independently cooperating between each of said walking beams and said frame for controlling the slidable positions of said walking beams transversely of said frame.

12. In a vehicle, in combination, a frame including a pair of frame side members, at least a portion of the length of which at one end thereof are arranged for direct reception and support of a load thereon, wheels for supporting said end of said frame, said wheels being arranged in pairs, one pair associated with each of said frame side members, one wheel of each of said pairs being positioned between said frame side members and the remaining wheel of each of said pairs being positioned laterally outwardly of said frame side members, said frame side members passing between said wheels and said wheels projecting vertically above that portion of said frame side members passing therebetween.

13. In a vehicle, in combination, a frame including a pair of laterally spaced frame side members at least a portion of the length of which form a trackway for the passage and directs support of a load thereon, a pair of wheels associated with each of said frame side members at one end thereof for supporting said end of said frame, and means securing each of said pairs of wheels to said frame with the axes of rotation of said wheels below said frame side members with one of each of said pairs of wheels positioned between said frame side members and the remaining wheel of each of said pairs of wheels positioned laterally outwardly of said frame side members, said wheels projecting upwardly beyond the upper surface of said frame side members over the length thereof between said wheels.

14. In a vehicle, in combination, a frame including a pair of frame side members, at least a portion of the length of which forms a trackway for the direct support and passage of a load thereover, a longitudinally extending walking beam positioned under each of said frame side members adjacent one end thereof and secured relative thereto for pivotal movement between its ends about an axis extending transversely of said frame, a cross axle pivotally mounted between its ends on each end of each of said walking beams for pivotal movement about an axis extending generally longitudinally of said vehicle, a wheel rotatably mounted upon each end of each of said cross axles, those wheels mounted upon the inner ends of said cross axles being positioned between said frame side members and the remaining wheels being positioned laterally outwardly of said frame side members, and said frame side members being received between the corresponding pairs of wheels at each end of the corresponding walking beam and said wheels projecting vertically above said frame side members over the length of said walking beams.

15. In a vehicle, in combination, a frame including a pair of frame side members at least a portion of the length of which are adapted for the direct support and passage of a load thereon, a walking beam positioned below each of said frame side members adjacent one end thereof, means connecting each of said walking beams to said frame for pivotal movement about a horizontal axis extending transversely of the length of said frame and for bodily slidable movement along such axis, a cross axle pivotally secured between its ends to each end of each of said walking beams for pivotal movement about an axis extending longitudinally of the corresponding said walking beam, a wheel rotatably mounted upon each end of each of said cross axles, those wheels mounted upon the inner ends of said cross axles being located between said frame side members and the remaining wheels being located laterally outwardly of said frame side members, all of said wheels projecting vertically above said frame side members over that length thereof corresponding with the length of said walking beam, means limiting said sliding movement of said walking beams to an amount less than that required to bring said wheels into contact with said frame side members, and means for effecting said sliding movement of said walking beams.

FREDERICK M. REID.